UNITED STATES PATENT OFFICE.

ALF BJERCKE, OF CHRISTIANIA, NORWAY.

METHOD OF PRODUCING COFFEE-LIKE OR TEA-LIKE BEVERAGES AND PRODUCTS.

1,257,451. Specification of Letters Patent. Patented Feb. 26, 1918.

No Drawing. Application filed May 29, 1916. Serial No. 100,733.

*To all whom it may concern:*

Be it known that I, ALF BJERCKE, wholesale dealer, citizen of Norway, residing at Christiania, Norway, have invented new and useful improvements in methods of producing coffee-like or tea-like household beverages from rinds of fruits belonging to the tree genus *Citrus*, and products, of which the following is a specification.

Many attempts have been made to produce substitutes for coffee, tea and other refreshments, such attempts having been more or less successful. Especially for the production of coffee a number of patents have been granted, almost all of which relate to the use of barley prepared according to one or another method for obtaining a product, which after being boiled in water had to give a drink with the same properties as coffee but without having its noxious effects, which are caused by the caffein contained in natural coffee.

The present invention has for its object to provide a method of producing from rinds of fruits belonging to the tree-genus "*Citrus*" a product, which when boiled in water gives a houshold beverage, that as regards taste might be suggested to be something between coffee and tea. It has been found that the beverage produced by boiling or extracting the product referred to possesses an agreeable taste as well as stimulating properties. Being also a refreshment harmless to the nerves and organism, the beverage will be preferred to coffee by anyone with whom the effects of caffein do not agree.

The present method consists essentially in this, that the rinds of the fruit genus above mentioned which contain bitter-substances, are firstly assorted as to ripeness, thickness, etc., and according to the size the rinds are then cut or divided into pieces, washed and softened. Thereafter the rinds are subjected to a burning necessary for obtaining the intended product, such burning being effected by firstly heating the material up to about 180 degrees C., whereby an aqueous ethereal distillate is driven out, then the receiver is shifted and the material is heated to a temperature of about 215 degrees C. During this last heating one obtains in the receiver as by-products a brown aromatic oil, lower fatty acids and other organic products of destruction. The material now ready burnt is then cooled preferably without access of air, whereafter it is ground or pulverized in suitable manner. The finished product is packed and is ready for sale.

The product has an appearance and an aroma of a striking resemblance to ordinary burnt and ground coffee, and when boiled or extracted in hot water it yields a coffee or tea-like beverage with properties as explained above.

Having now described my invention, what I claim as new and desire to secure by Letters Patent is:

1. A process of producing a coffee-like or tea-like product, which consists in subjecting rinds of fruits belonging to the tree-genus "*Citrus*" first to a low heating at about 180 degrees C., withdrawing the aqueous ethereal distillate produced, and then subjecting the rinds to a higher heating at about 215 degrees C., withdrawing the aromatic oil, lower fatty acids and other organic compounds produced, and pulverizing the remaining product.

2. A coffee-like or tea-like product consisting of pulverized roasted rinds of fruits belonging to the tree-genus "*Citrus*."

In testimony whereof I have signed my name to this specification in the presence of two subscribing witnesses.

ALF BJERCKE.

Witnesses:
AXU LAHN,
HANS ZAHARNSEY.

Copies of this patent may be obtained for five cents each, by addressing the "Commissioner of Patents, Washington, D. C."